United States Patent [19]
Nakamura et al.

[11] Patent Number: 6,009,353
[45] Date of Patent: Dec. 28, 1999

[54] NESTING METHOD AND PUNCHING METHOD FOR MACHINE TOOL CONTROL SYSTEM

[76] Inventors: Kaoru Nakamura, 2-18-13 Takamori, Isehara-shi, Kanagawa, 259-11; Hideki Fujiwara, 948-41, Fukaya-cho, Totsuka-ku, Yokohama-shi, Kanagawa, 245, both of Japan

[21] Appl. No.: 08/883,355

[22] Filed: Jun. 26, 1997

[30] Foreign Application Priority Data

Jun. 24, 1997 [JP] Japan ................................. 9-167764

[51] Int. Cl.⁶ ........................................... G06F 19/00
[52] U.S. Cl. ................................ 700/172; 700/214
[58] Field of Search ..................... 364/474.14, 474.11, 364/474.21, 472.02, 476.01, 146, 478.05, 478.13, 478.02; 414/273

[56] References Cited

U.S. PATENT DOCUMENTS

| | | | |
|---|---|---|---|
| 4,473,883 | 9/1984 | Yoshida et al. | 364/474.21 |
| 5,249,131 | 9/1993 | Kato | 364/478.05 |
| 5,359,175 | 10/1994 | Miyagawa et al. | 219/121.82 |
| 5,920,480 | 7/1999 | Nakamura et al. | 364/468.21 |

*Primary Examiner*—William Grant
*Assistant Examiner*—Chad Rapp
*Attorney, Agent, or Firm*—Greenblum & Bernstein, P.L.C.

[57] ABSTRACT

A controller for transferring information for managing and controlling machine tools, an automatic warehouse and a CNC device reads material information (e.g., size, shape, material) on an actual material on a pallet in an automatic warehouse before transferring a machining program for nesting. The controller judges whether the material information matches a material on which products are nested, newly nests the products of a machining schedule on the material of the material information when they do not match, and transfers the machining program for the nesting to the CNC device and machine tools.

18 Claims, 16 Drawing Sheets

FIG.7

| PRODUCT | NUMBER OF PRODUCTS | DELIVERY DATE | MACHINE TOOL |
|---|---|---|---|
| A | 2 | 06-30 | NCT |
| B | 1 | 06-30 | NCT |
| C | 1 | 06-30 | NCT |
| D | 5 | 06-30 | NCT |
|   |   |   |   |

FIG.8

| SHELF NO. | PALLET NO. | NAME OF MATERIAL | NUMBER OF MATERIALS |
|---|---|---|---|
| 1 | PALLET 1 | MATERIAL Pa | 5 |
| 2 | PALLET 2 | MATERIAL Pb | 3 |
| 3 | PALLET 3 | MATERIAL Pc | 7 |
| 4 |   |   |   |
| 5 |   |   |   |
|   |   |   |   |

FIG.9

|   | MACHINING PROGRAM | NUMBER OF MATERIALS | MATERIAL |
|---|---|---|---|
| 10 | m1 | 1 | R1 |
| 20 | m2 | 1 | R2 |
| 30 | m3 | 1 | R3 |

FIG.16

| PRODUCT | QUANTITY | SIZE | DELIVERY DATE | MACHINE FOR POST-PROCESSING |
|---|---|---|---|---|
| | | | | |
| A | 3 | 300×600 | 06-30 | Va |
| B | 5 | 400×450 | 06-30 | Va |
| C | 2 | 600×300 | 06-30 | Vb |
| D | 3 | 100×10 | 06-30 | Vc |
| | | | | |

NESTING METHOD AND PUNCHING METHOD FOR MACHINE TOOL CONTROL SYSTEM

BACKGROUND OF THE INVENTION

1. Field of the Invention

The present invention relates to a nesting method and a punching method for a machine tool control system capable of machining efficiently in a short period of time.

2. Background and Related Arts

When a plurality of parts of different sizes are to be blanked from a single material (standard length material) in sheet metal processing, nesting for allocating these parts to the material in such a manner that the proportion of a portion of the material effectively used as the parts in the whole material becomes large is automatically performed by a computer.

For instance, in a machine tool control system shown in FIG. 1, a tool center 1 reads a machining schedule prestored in a file 3 and carries out nesting processing on a prestored material when the machining schedule indicates sheet metal processing for blanking a plurality of products.

This nesting processing is described in detail. FIG. 2 is a diagram for explaining the nesting processing of the tool center 1. For instance, when it is planned to nest two products A, one product B and one product C having respective shapes shown in FIG. 2 on the same material, a nesting processing unit 15 of the tool center 1 reads a reference shape ai from which these prestored products can be blanked from a material information file 7 and plans to nest the above products on the shape ai.

For instance, two products A, one product B and one product C are to be blanked from the shape ai as shown in FIG. 2 and a machining program m1 for this blanking information S1 is created and stored in a machining program file 9.

In addition to the above products, when a product D is planned to be nested on the same material, the nesting processing unit 15 of the tool center 1 reads a shape bi from which the product D can be blanked from the material information file 7 and plans to nest the product D.

For instance, nine products D are to be blanked from this shape bi as shown in FIG. 2 and a machining program m2 for this blanking information S2 is created and stored in the machining program file 9.

As shown in FIG. 2, nesting schedules Ki based on these machining programs m1 and m2 and blanking information S1 and S2 are created. In FIG. 2, for example, a "10-th" nesting schedule Ki shows that nesting is carried out on a single material using the machining program m1 based on the blanking information S1. A "20-th" nesting schedule Ki shows that nesting is carried out on a single material using the machining program m2 based on the blanking information S2.

The tool center 1 copies the nesting schedules Ki and the machining programs mi into a controller 11.

FIG. 4 shows the configuration of an automatic warehouse 131 included in a peripheral equipment 13. The controller 11 draws the first nesting schedule Ki, compares this nesting schedule Ki with prestored inventory information Ji in the automatic warehouse 131 and judges whether the material ti of the nesting schedule Ki is present in the inventory information Ji.

This inventory information Ji, as shown in FIG. 4, stores numbers of shelves 133 (133a, 133b, 133c, . . . ) of the automatic warehouse 131, names of pallets 135 (135a, 135b, 135c, . . . ), names (including shape, size and material) of materials (material A, material B, . . . ) on the pallets 135 and the number of the materials in a corresponding manner.

When the material ti of the nesting schedule Ki is stored as inventory information Ji, a signal (to be referred to as "shelf switching instruction signal" hereinafter) for switching to a shelf storing the material corresponding to the material ti is supplied to a line control board 23. A machining program mi for the machining schedule Ki is drawn and transferred to a CNC device 25 by, for example, DNC transfer system.

The automatic warehouse 131 draws a pallet 135 on a shelf 133 specified by the shelf switching instruction signal and carries a material pi mounted on this pallet 135 to a machine tool 27, such as a turret punch press. The machine tool 27 blanks the material pi mounted on the pallet 135 based on the machining program mi specified by the nesting schedule Ki. When the machine tool 27 cannot blank the material pi mounted on the pallet 135 based on the machining program mi, it supplies a blanking error signal to the controller 11 through the line control board 23 immediately.

The controller 11 stops operation as soon as it receives the blanking error signal. That is, the conventional machine tool control system makes a blanking plan without confirmation from the tool center I that a material pi large enough to enable the products of the nesting schedule ki to be blanked therefrom is actually present in the automatic warehouse 131.

The machine tool 27 is provided with a terminal 29 for handling an urgent order or special order on the site. When an operator operates this terminal 29, the operator judges whether a material (not blanked) with which the order can be accepted is present in the automatic warehouse 131 and operates the terminal 29 to carry out nesting when the material is present on a pallet of a shelf.

When products blanked by the machine tool 27 are stored on pallets, either a nesting storage system, such as that shown in FIG. 3A, or a position specification storage system, such as that shown in FIG. 3B, is employed.

The nesting storage system shown in FIG. 3A is to arrange blanked products on a pallet 135 by reproducing a blanked image. This system has such advantages that storage efficiency is high without excess or shortage of space on the pallet 135 and products can be stored at a uniform height.

The position specification storage system shown in FIG. 3B is to pile up the same products at the same location of the pallet 135. This system is advantageous when the products are to be taken out because the same products are stored at the same location of the pallet 135.

Punching by the machine tool 27 is carried out using a single turret punch press as a punching machine. That is, a plurality of punches/dies are set on upper and lower turrets of the turret punch press and required punches/dies are searched from the plurality of punches/dies and positioned at the machining location to carry out several different types of punching on a workpiece.

As described above, since the conventional machine tool control system makes a blanking plan without the tool center's confirmation that a material large enough to enable the products of a nesting schedule to be blanked therefrom is actually present in the automatic warehouse, it has such a problem that machining takes time.

Therefore, when there is no material of a size predetermined by the tool center in the automatic warehouse, even if a machining program for blanking is created, machining based on this machining program may not be carried out.

Since the tool center does not carry out nesting for a special order, but a field operator carries out nesting by selecting a material which is not blanked, a large area remains on this material after nesting.

Further, when blanked products are stored on a pallet, either nesting storage or position specification storage system is employed. However, in either system, since the tool center causes products to be stored without taking into consideration the field conditions and schedule, there has been such a problem that a pallet has been occupied by specific products for a long time or machining takes time because a pallet must be taken in and out frequently.

Further, since machining is carried out by a single turret punch press based on a nesting schedule, there has been such a problem that machining takes time as a whole because a machining time required by the turret punch press takes long and other machine tools on a production line have to wait.

SUMMARY OF THE INVENTION

The present invention has been made to solve the above problems and it is therefore an object of the present invention to obtain a machine tool control system capable of machining efficiently in a short period of time by making a nesting schedule which takes into consideration line conditions on the automatic warehouse side and the machine tool side.

To attain the above object, there is provided a nesting method for a machine tool control system in which a controller for transferring information for managing and controlling machine tools, an automatic warehouse and a CNC device nests the blanking shapes of products on a prestored material on a pallet of the automatic warehouse based on a machining schedule from a tool center and transfers a machining program for this nesting to the machining tool side through the CNC device to blank the material on the pallet of the automatic warehouse. The method may comprise the steps of: reading material information on the actual material on the pallet of the automatic warehouse before transferring the machining program for nesting; judging whether the material information matches a material of the machining program; nesting products of the machining schedule on the material of the material information when they do not match; and transferring the machining program for this nesting.

According to a preferred embodiment of the present invention, when the products of the machining schedule are newly nested on the material of the material information and all the products cannot be nested on the material, another material in the automatic warehouse is drawn and remaining products are newly nested on the drawn material.

To attain the above object, there is also provided a nesting method for a machine tool control system in which a controller for transferring information for managing and controlling machine tools, an automatic warehouse and a CNC device nests the blanking shapes of products on a prestored material on a pallet of the automatic warehouse based on a machining schedule from a tool center and transfers a machining program for this nesting to the machine tool side through the CNC device to blank the material on the pallet of the automatic warehouse. The method comprises the steps of: accessing information on an odd material to retrieve an odd material from which products to be interrupt nest inputted from a terminal can be blanked from the odd material information; and nesting the products to be interrupt nested on the retrieved odd material.

In addition, in order to attain the above object, there is provided a nesting method for a machine tool control system in which a controller for transferring information for managing and controlling machine tools, an automatic warehouse and a CNC device nests the blanking shapes of products on a prestored material on a pallet of the automatic warehouse based on a machining schedule from a tool center and transfers a machining program for this nesting to the machine tool side through the CNC device to blank the material on the pallet of the automatic warehouse. The method comprises the steps of: accessing information on each pallet of the automatic warehouse to group products according to a delivery date and type of machining for post-processing of the machining schedule; retrieving a pallet having a shape capable of storing the grouped products from the pallet information; nesting storage positions of the grouped products on the retrieved pallet based on the grouping information; and transferring the storage positions based on this nesting to the automatic warehouse together with the machining program.

To attain the above object, there is further provided a punching method for a machine tool control system having a plurality of punching machines for punching a sheared material based on a transmitted machining program and causing the plurality of punching machines to punch the material by informing nesting information on the material, the method comprising the steps of: dividing the nesting information for punching by each of the plurality of punching machines and creating a plurality of machining programs for the respective divided nesting information; and transferring the plurality of machining programs to the respective punching machines simultaneously when different types of punching are made on the material.

The nature, principle and utility of the present invention will become more apparent from the following detailed description when read in conjunction with the accompanying drawings.

BRIEF DESCRIPTION OF THE DRAWINGS

In the accompanying drawings:

FIG. 7 is a diagram for explaining a machining schedule file;

FIG. 8 is a diagram for explaining an inventory master information file;

FIG. 9 is a diagram for explaining a nesting schedule file;

FIG. 16 is a diagram showing a example of a machining schedule file in the third embodiment;

DESCRIPTION OF THE PREFERRED EMBODIMENTS

Preferred embodiments of the present invention are described in detail hereinunder with reference to the accompanying drawings.

First Embodiment

Figure 1:
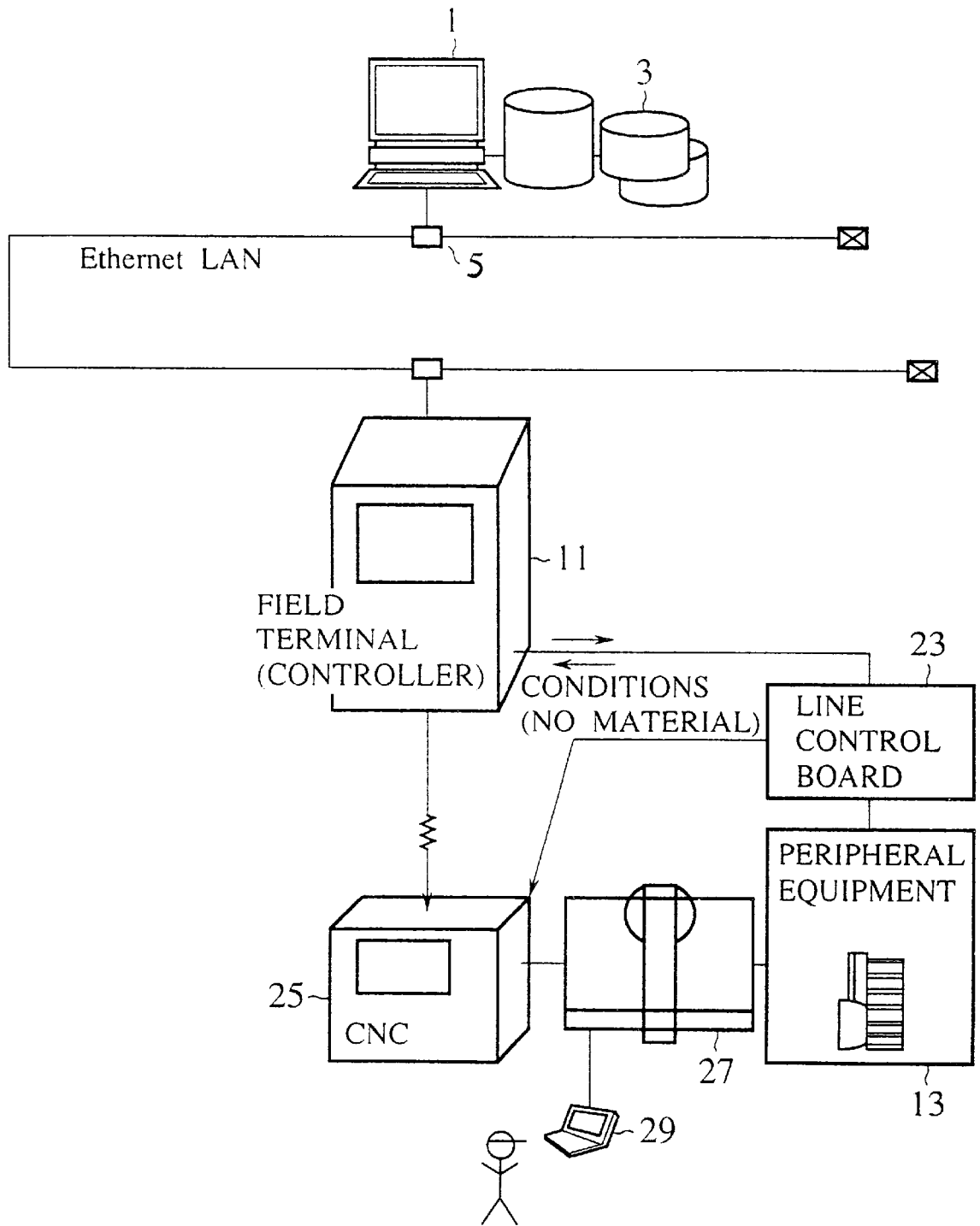
FIG. 1 is a schematic structural diagram of a machine tool control system of the prior art.
Figure 2:
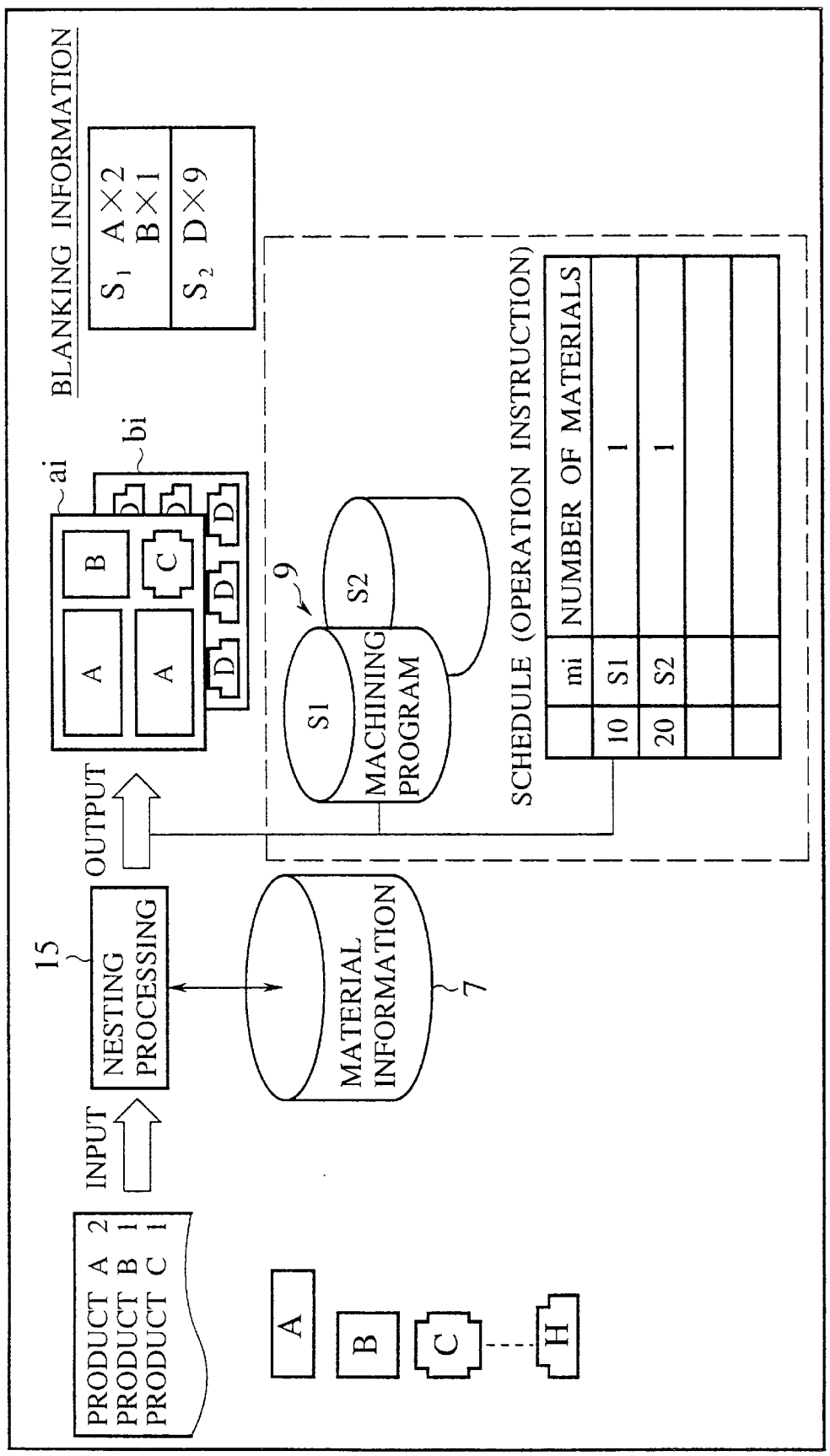
FIG. 2 is a diagram for explaining the nesting processing of a tool center in the machine tool control system of the prior art.
Figure 3A:
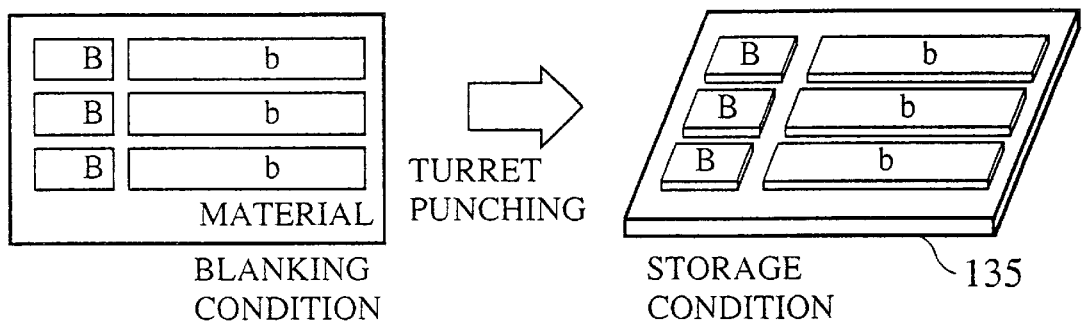
FIG. 3A and 3B are diagrams for explaining storage on a pallet in the prior art.
Figure 3B:
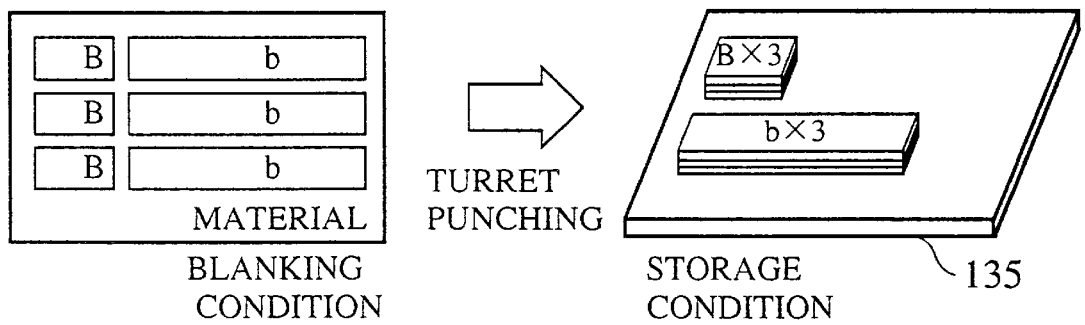
Figure 4:
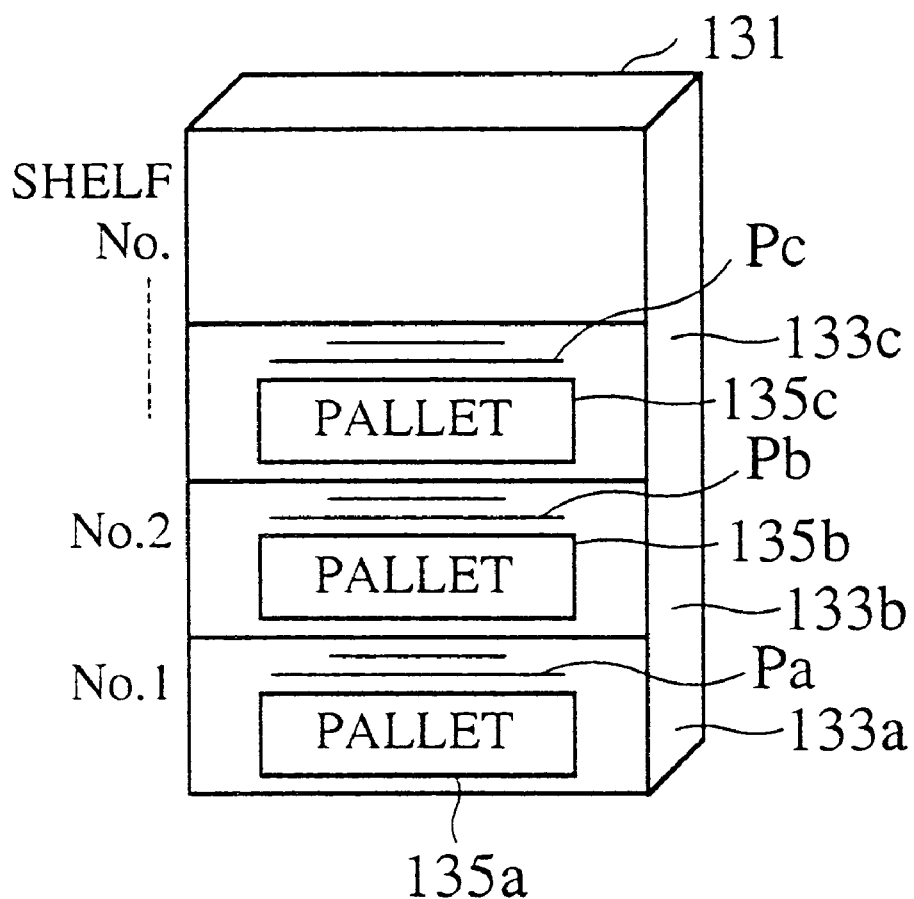
FIG. 4 is a diagram showing the configuration of an automatic warehouse included in a peripheral equipment.
Figure 5:
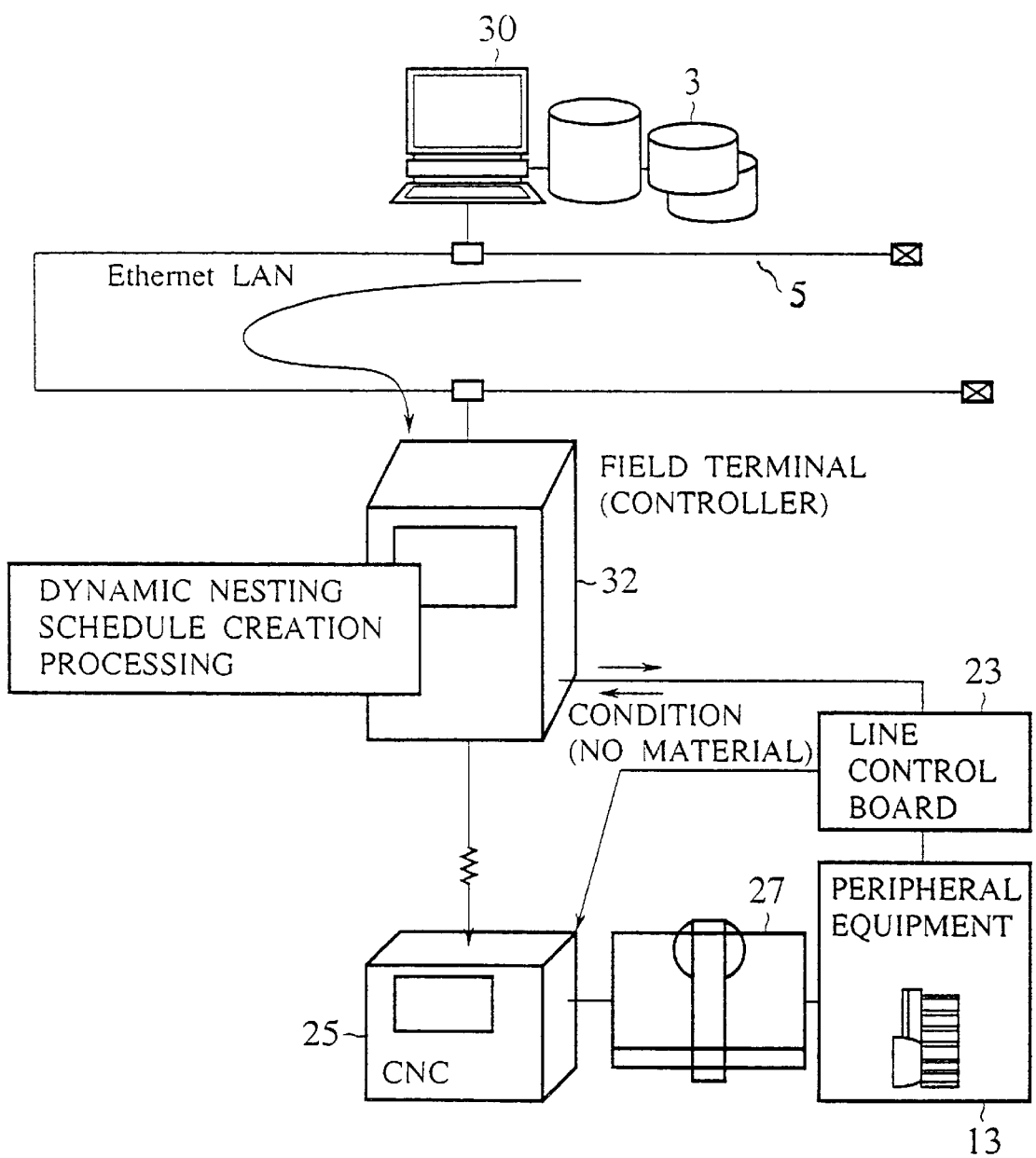
FIG. 5 is a schematic structural diagram of a first embodiment of the machine tool control system according to the present invention.

FIG. 5 is a schematic structural diagram of a first embodiment of the machining tool control system according to the present invention. In the machine tool control system of FIG. 5, a tool center 30 transfers by Ethernet or LAN 5 and copies a machining schedule for scheduling by when and how many predetermined products are to be machined and a machining program for machining these products into a controller 32.

The controller 32 reads a machining schedule hi for the day and the materials of inventory information Ji on an automatic warehouse 131 of the peripheral equipment 13, nests the products of the machining schedule hi based on the materials ti, determines a material ei from which the largest number of products can be blanked, and creates a nesting schedule Ki.

Thereafter, the controller 32 draws a machining program mi, transfers it to a CNC device 25 and sends a shelf switching instruction signal for switching to a shelf storing the material ei to the automatic warehouse 131 through a line control board 23.

At this point the controller 32 reads the current conditions (consisting of shelf numbers, pallet numbers, material names pi (including shape, size, and type of material), number of materials, etc.) of the automatic warehouse 131 from the line control board 23 and judges whether the material ei of the nesting schedule Ki and the actual material pi thus read match. When they do not match, nesting is carried out again based on the shape of the actual material pi.

When the actual material pi is too small to blank all the products of the nesting schedule Ki, another material fi is drawn from the inventory information Ji, and the remaining products are nested on this material fi.

Figure 6:
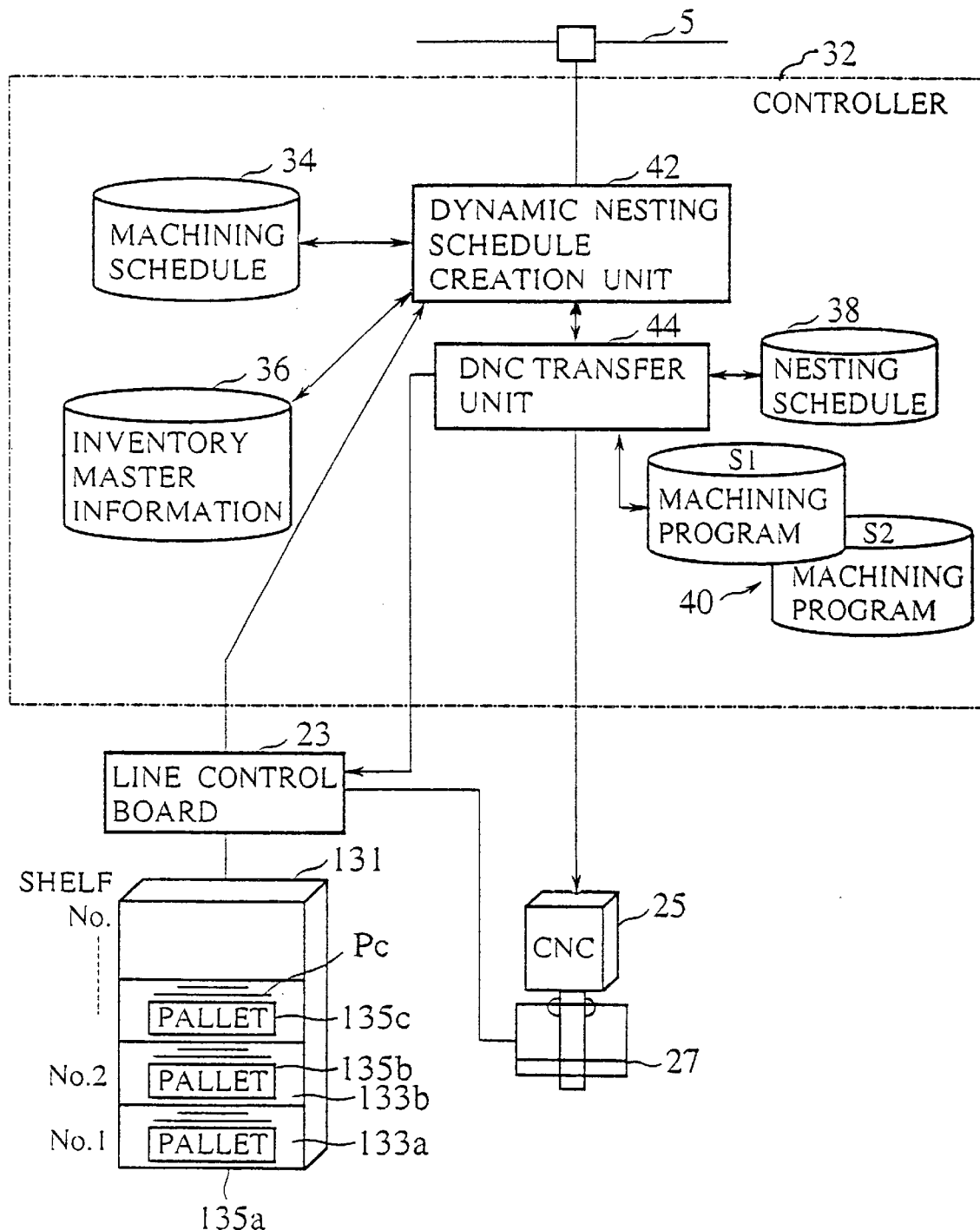
FIG. 6 is a diagram showing the detail configuration of a controller in the first embodiment.

The controller 32, as shown in FIG. 6, comprises a machining schedule file 34, an inventory master information file 36, a nesting schedule file 38, a machining program file 40, a dynamic nesting schedule creating unit 42 and a DNC transfer unit 44.

The machining schedule file 34, as shown in FIG. 7, prestores a machining schedule hi which consists of product names (A, B, C, D, . . . ), number of products, delivery date and machine tools in a corresponding manner.

The inventory master information file 36, as shown in FIG. 8, prestores inventory information Ji which consists of shelf numbers of the automatic warehouse 131, pallet numbers, material names ti (including shape, size and type of material), and the number of materials in a corresponding manner.

The nesting schedule file 38, as shown in FIG. 9, prestores a nesting schedule Ki which consists of machining programs (m1, m2, m3, . . . ), the number of materials, material names ei, actual material names pi or material names fi (collectively referred to as "material Ri" (R1, R2, R3, . . . )) in a corresponding manner. As noted above, the material names may include or indicate material information, such as the shape, size and type of material.

The dynamic nesting schedule creating unit 42 reads a predetermined amount of products from the machining schedule file 34 and retrieves a material ei from which these products can be blanked from the inventory master information file 36.

The dynamic nesting schedule creating unit 42 draws, from the machining program file 40, a machining program mi corresponding to the blanking information si for blanking products from the retrieved material ei, and sequentially stores the machining program mi, the material name ei and the number of materials in the nesting schedule file 38 as a nesting schedule kei.

The dynamic nesting schedule creating unit 42 reads the conditions (consisting of shelf number, pallet number, material name fi, the number of materials, etc.) of the automatic warehouse 131 and judges whether the material ei of the nesting schedule kei and the actual material pi thus read match. Whey they do not match, the unit 42 carries out nesting again based on the shape of the actual material pi and stores this nesting schedule kpi (Ki←kpi) in the nesting schedule file 38. When the actual material pi is smaller, the unit 42 draws another material fi from the inventory information Ji, nests the remaining products on this material fi, and stores this nesting schedule kfi (Ki←kfi) in the nesting schedule file 38.

The DNC transfer unit 44 draws a nesting schedule kei, kpi or kfi (collectively referred to as "nesting schedule Ki") from the nesting schedule file 38, sends a shelf switching instruction signal for switching to a shelf having a material Ri included in this nesting schedule Ki to the automatic warehouse 131 through the line control board 23 and transfers the machining program mi to the CNC device 25 by DNC transfer system.

Figure 10:
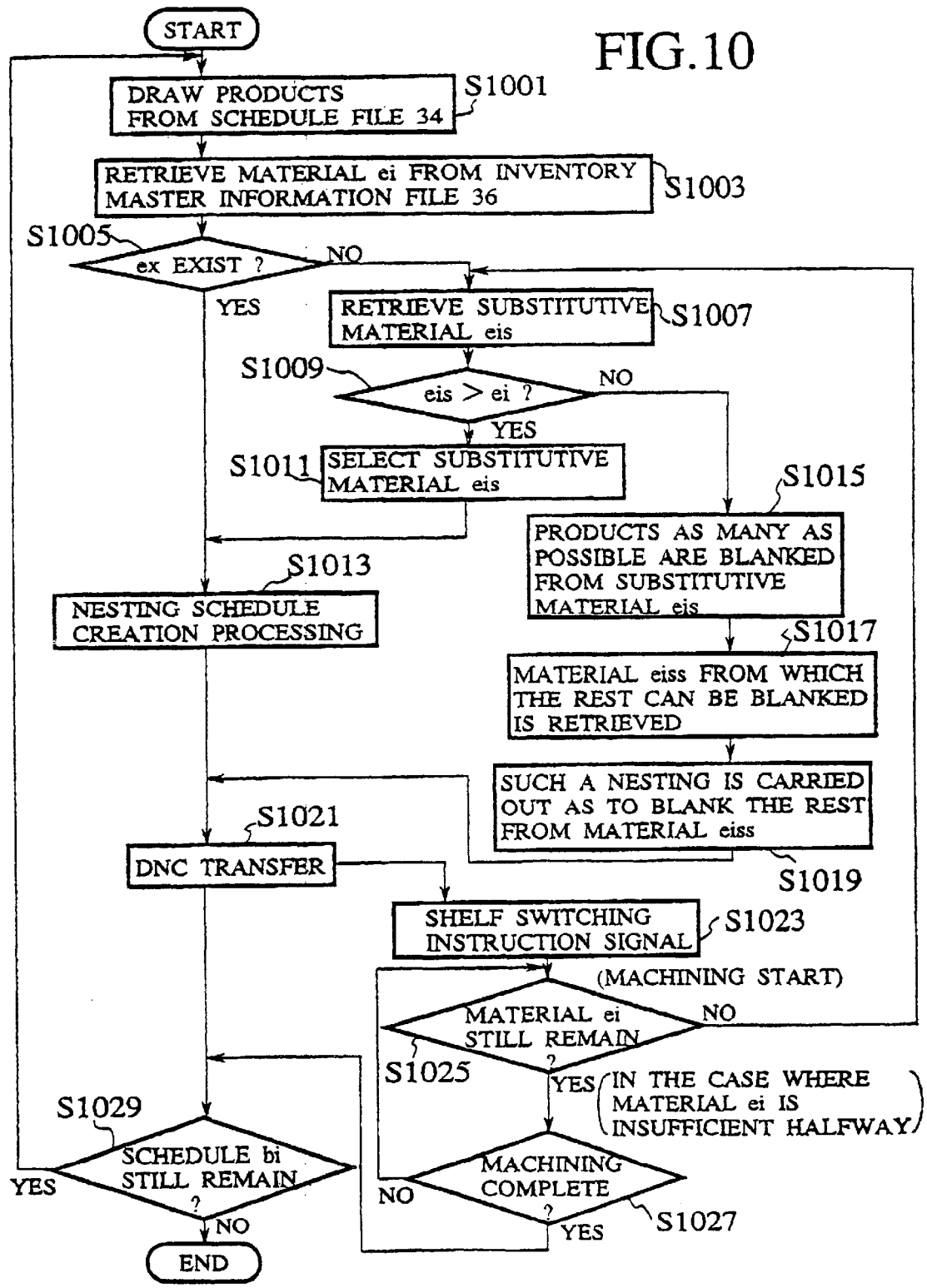
FIG. 10 is a flow chart for explaining the operation of the first embodiment of the machine tool control system according to the present invention.

The operation of the machine tool control system according to the first embodiment constituted as described above is described with reference to FIG. 10.

The tool center 30 transfers and copies a machining schedule for scheduling by when, what product and how many products are to be machined into the machining schedule file 34 of the controller 32 and a machining program for machining these products into the machining program file 40. The controller 32 carries out the following processing along with this copying.

In step S1001, the dynamic nesting schedule creating unit 42 of the controller 32 draws a machining schedule hi for the day from the machining schedule file 34. For example, products A, B and C of the machining schedule file 34 shown in FIG. 7 are drawn.

Thereafter, the dynamic nesting schedule creating unit 42 retrieves a material ei which is large enough to enable a combination of the products and the number of the combinations to be nested thereon from the inventory master information file 36 (step S1003). Then it is judged whether such a material ei exists (step S1005). When such a material ei exists, the processing proceeds to step S1013. On the other hand, when such a material ei does not exist, the dynamic nesting schedule creating unit 42 retrieves a substitutive material eis (step S1007). It is judged whether the substitutive material eis is larger than the material ei (step S1009). When the substitutive material eis is larger than the material ei, the dynamic nesting schedule creating unit 42 selects the substitutive material eis rather than the material ei (step S1011), and processing proceeds to step S1013.

In step S1013, the dynamic nesting schedule creating unit 42 retrieves a machining program mi for machining these products from the machining program file 40, and stores the machining program mi and the material ei in the nesting schedule file 38 as a set.

For example, a second material Pb in the inventory master information file 36 is drawn as the material ei for nesting products A, B and C.

In step S1009, when the substitutive material eis is not larger than the material ei, the dynamic nesting schedule creating unit 42 creates such a nesting schedule that products as many as possible are blanked from the substitutive material eis (step S1015). Then, a material eiss from which the rest can be blanked is retrieved (step S1017). Such a nesting is carried out as to blank the rest from the material eiss (step S1019), and the processing proceeds to the step S1021.

In step S1021, the machining program mi is transferred to the CNC device 25 by DNC transfer system.

In step S1023, a shelf switching instruction signal for switching to a shelf having the material of the nesting schedule is sent to the automatic warehouse 131 through the line control board 23.

It is judged whether any material ei still remains (step 1025). When any material ei does not remain, the processing returns to step S1007. On the other hand, when any material ei still remains, it is judged whether the machining has been completed (step S1027). When the machining has not been completed yet, the processing returns to step S1025. When the machining has been completed, the processing proceeds to step S1029.

In step S1029, it is judged whether any machining schedule hi still remains. When any machining schedule hi remains, the processing returns to step S1001. On the other hand, when any machining schedule hi does not remain, the processing is terminated.

That is, according to the first embodiment, when the shape of the actual material on the pallet on the respective shelf of the automatic warehouse and the shape of the planned material do not match, nesting is newly planned with reference to the shape of the actual material.

Therefore, since it is not necessary to make a new program again, there is obtained such an effect that machining is completed quickly.

When nesting is newly carried out, if all the products of a drawn machining schedule cannot be nested on the material, the remaining products are nested on another material in the automatic warehouse. Therefore, there is obtained such an effect that it is not necessary to correct nesting even if there are a large number of products to be nested.

Second Embodiment

Figure 11:
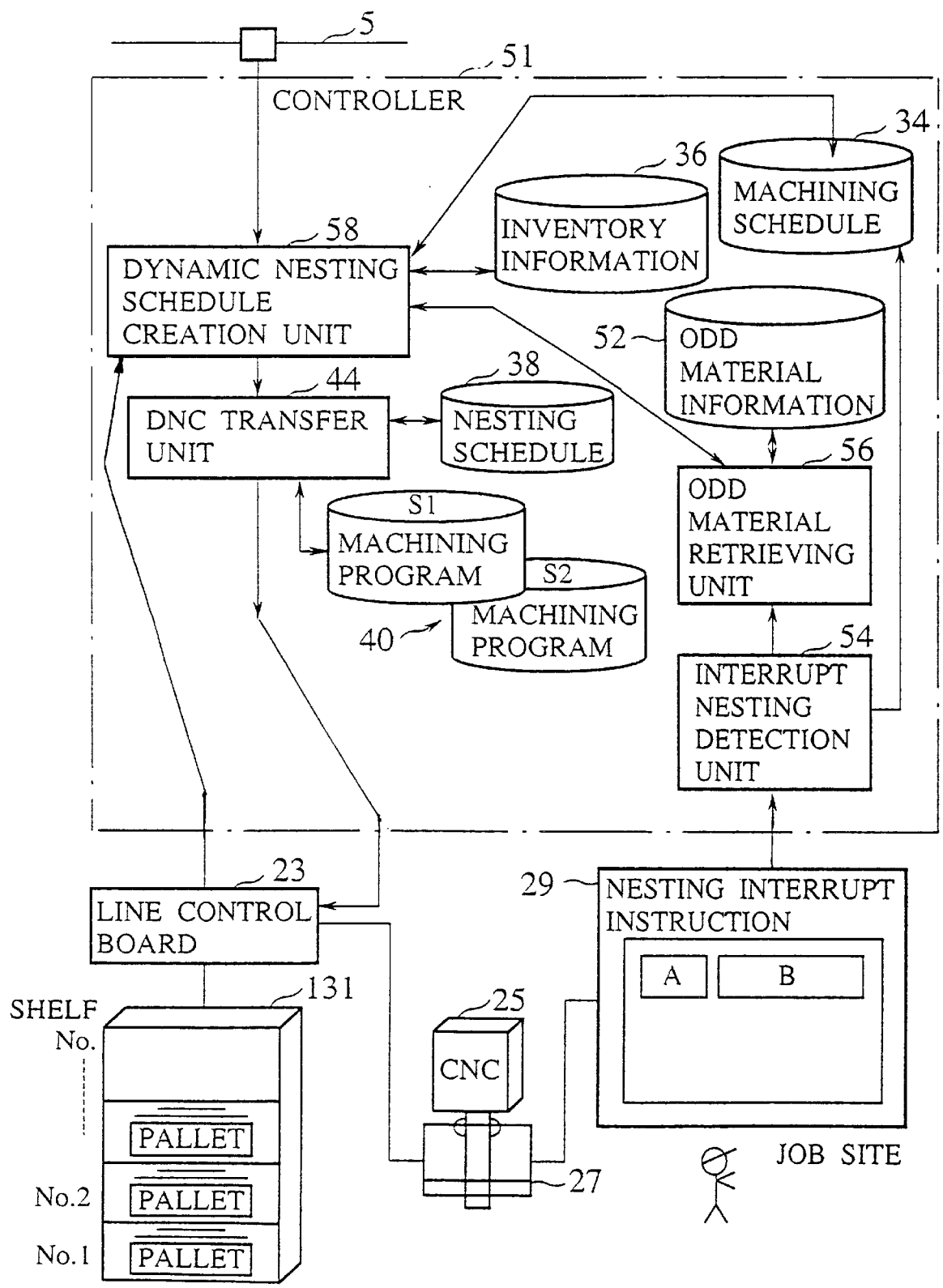
FIG. 11 is a schematic structural diagram of a second embodiment of the machine tool control system according to the present invention.

FIG. 11 is a schematic structural diagram of a second embodiment of the machine tool control system according to the present invention. The machine tool control system of FIG. 11 comprises a controller 51 for making interrupt nesting on an odd material zi which has been left over after blanking when a field operator makes interrupt nesting on a special order by operating the terminal 29 of the machine tool.

This controller 51 comprises an odd material information file 52, an interrupter nesting detection unit 54, an odd material retrieving unit 56 and a dynamic nesting schedule creating unit 58.

The odd material information file 52 stores information zi on a plurality of odd materials which have been left after blanking. The odd material information zi consists of odd material names (such as shape and material), the number of odd materials and the like.

The interrupt nesting detection unit 54 reads nesting information which it has received through the terminal 29, detects what products are allocated to which material and how, and stores a machining schedule hie in which a symbol indicating an urgent or special order is added to this detection result in the machining schedule file 34.

The dynamic nesting schedule creating unit 58 reads the current conditions (such as shelf numbers, pallet numbers, material names pi, the number of materials, etc.) of the automatic warehouse 131 from the line control board 23 and judges whether the material ei of the nesting schedule Ki and the actual material pi thus read match. When they do not match, nesting is newly carried out based on the shape of the actual material pi. When the actual material pi is too small to blank the products of the nesting schedule Ki therefrom, another material fi is drawn from the inventory information Ji and the remaining products are nested on this material fi.

Further, the dynamic nesting schedule creating unit 58 accepts this machining schedule hie in preference to others as an interrupt when the machining schedule hie for an urgent or special order is present in the machining schedule file 34, activates the odd material retrieving unit 56 and informs the unit 56 of the machining schedule hie at the same time.

The odd material retrieving unit 56 reads the machining schedule hie from the dynamic nesting schedule creating unit 58, reads the products, the number of products, etc. of this machining schedule hie, retrieves odd material information which enables these products and the number of the products to be blanked from the odd material information file 52 and informs the dynamic nesting schedule creating unit 58 of this odd material information.

The machine tool control system constituted above is described below.

For instance, when the operator plans to nest the products A and B of a special order as shown in FIG. 11 by operating the terminal 29 of the machine tool 27, the interrupt nesting detection unit 54 detects this nesting plan and stores a machining schedule hie in which a symbol indicating an urgent or special order is added to the result of this detection in the machining schedule file 34.

The dynamic nesting schedule creating unit 58 accepts this machining schedule hie in preference to others as an interrupt when the machining schedule hie is present in the machining schedule file 34, activates the odd material retrieving unit 56 and informs the unit 56 of the machining schedule hie at the same time.

Figure 12:
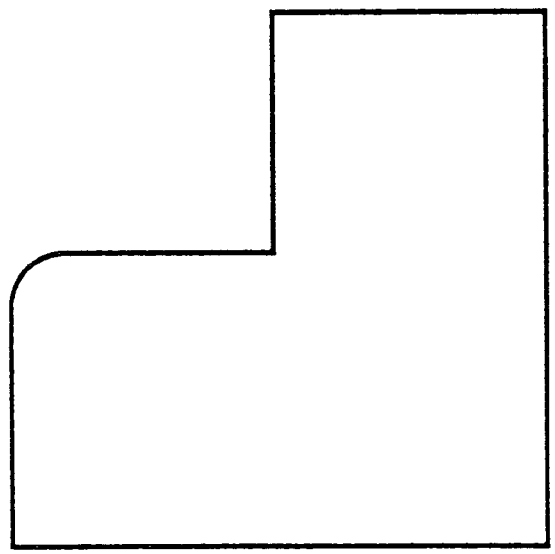
FIG. 12 is a diagram for explaining the second embodiment.

The odd material retrieving unit 56 reads the machining schedule hie from the dynamic nesting schedule creating unit 58 and draws odd material information on an odd material zi as shown in FIG. 12, for example, from the odd material information file 52.

Figure 13:
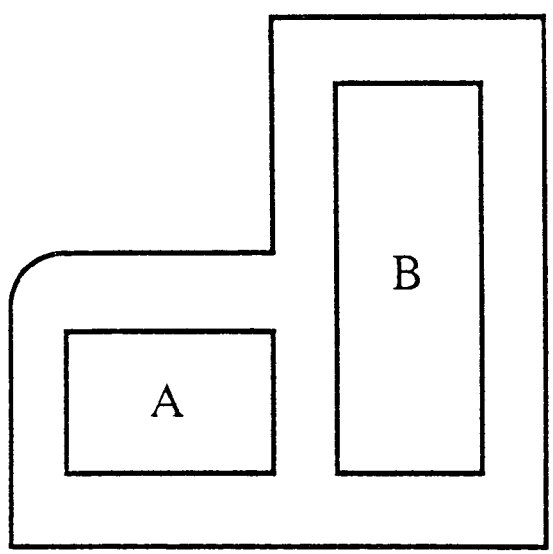
FIG. 13 is a diagram for explaining the second embodiment.

The dynamic nesting schedule creating unit 58 allocates the products of the machining schedule hie to the shape of the odd material zi, as shown, for example, in FIG. 13, when it is informed of the odd material information on the odd material zi from the odd material retrieving unit 56.

Therefore, since the odd material zi which has been left over after blanking is blanked based on this interrupt nesting when the field operator makes interrupt nesting on a special order by operating the terminal of the machine took, a large remaining area is not left over. Since an odd material is automatically blanked based on interrupt nesting unless the operator searches for a material having a large remaining area, there is obtained such an effect that the machining time is fast.

It is not always necessary to use an odd material for an interrupt special order and a material in the automatic warehouse 131 may be used instead. Further, an odd material may be used for a scheduled product.

Third Embodiment

Figure 14:
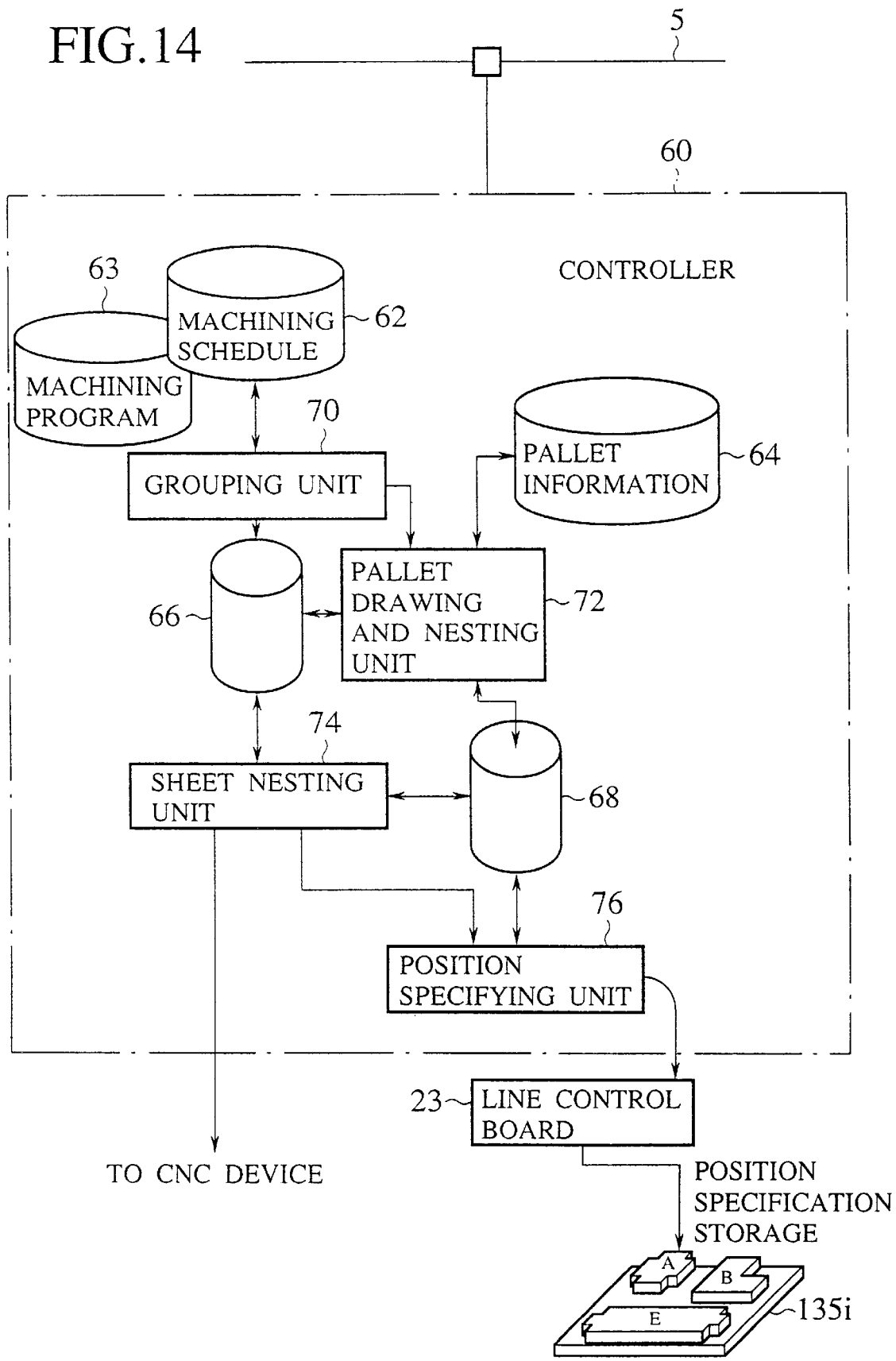
FIG. 14 is a schematic structural diagram of a third embodiment of the machine tool control system according to the present invention.

FIG. 14 is a schematic structural diagram of a controller according to a third embodiment of the machine tool control system according to the present invention.

The controller 60 of FIG. 14 nests products to be mounted on a pallet by grouping products having the same delivery date and machine tool for post-processing of the machining schedule hi and retrieving a pallet in the automatic warehouse 131 capable of mounting the grouped products.

A material (also simply referred to as "sheet") is blanked based on nesting information ni on a pallet and the blanked products are mounted on the pallet based on this nesting information ni.

The controller 60 comprises a machining schedule file 62, a machining program file 63, a pallet information file 64, a grouping file 66, and a pallet nesting file 68. The controller 60 further comprises a grouping unit 70, a pallet drawing and nesting unit 72, a sheet nesting unit 74 and a position specifying unit 76.

The machining schedule file 62 stores a machining schedule hi which consists of product name, quantity, size, delivery date and type of machining tool for post-processing.

The pallet information file 64 stores shelf numbers, the sizes of pallets, etc. in a corresponding manner.

The grouping file 66 stores grouping information Gi on products grouped according to delivery date and type of post-processing, machining program mi and machining schedule hi in a corresponding manner.

The pallet nesting file 68 stores nesting information ni on pallets for mounting S the products of each grouping information Gi. This nesting information ni consists of shelf numbers, pallet names, the locations of products on each pallet, etc.

The grouping unit 70 reads each machining schedule of the machining schedule file 62, groups products according to delivery time and type of post-processing, and stores this grouping information Gi, machining schedule hi and machining program mi in the grouping file 66.

The pallet drawing and nesting unit 72 compares the size of each pallet of the pallet information file 64 with each group information Gi when unit 70 finishes grouping, nests the number of products able to be stored on each pallet and stores the nesting information ni and the group information Gi in the pallet nesting file 68 in a corresponding manner.

The sheet nesting unit 74 reads the nesting information ni for each group in the pallet nesting file 68, takes out information on the same products of an immediate group from the nesting information ni, nests the products taken out on a material specified by the machining schedule hi one after another and transfers a machining program mi for executing the nesting information ni for machining.

The position specifying unit 76 reads nesting information ni on the pallet of the machining program mi each time the machining program mi is transferred and informs the automatic warehouse 131 of a storage position on the pallet 135i through the line control board 23.

The operation of the machine tool control system constituted above is described below with reference to FIGS. 15 and 16.

The grouping unit 70 reads the machining schedule hi shown in FIG. 16, for example, and groups products according to delivery date, size and type of machine tool for post-processing and stores the machining program and the machining schedule hi in the grouping file 66 (step S1501).

For instance, as shown in FIG. 16, products A, B, D, E, and J are grouped as group GI to be first machined in the subsequent step; products C, F, H and L are group as group G2 to be machined next in the subsequent step; and these groups are stored separately.

Thereafter, the pallet drawing and nesting unit 72 reads pallet information on the automatic warehouse 131 prestored and nests the products of each group on a pallet specified by this pallet information. When all the products cannot be stored on one pallet, another pallet is drawn to store the remaining products and the remaining products are nested on the pallet (step S1503).

Figure 15:
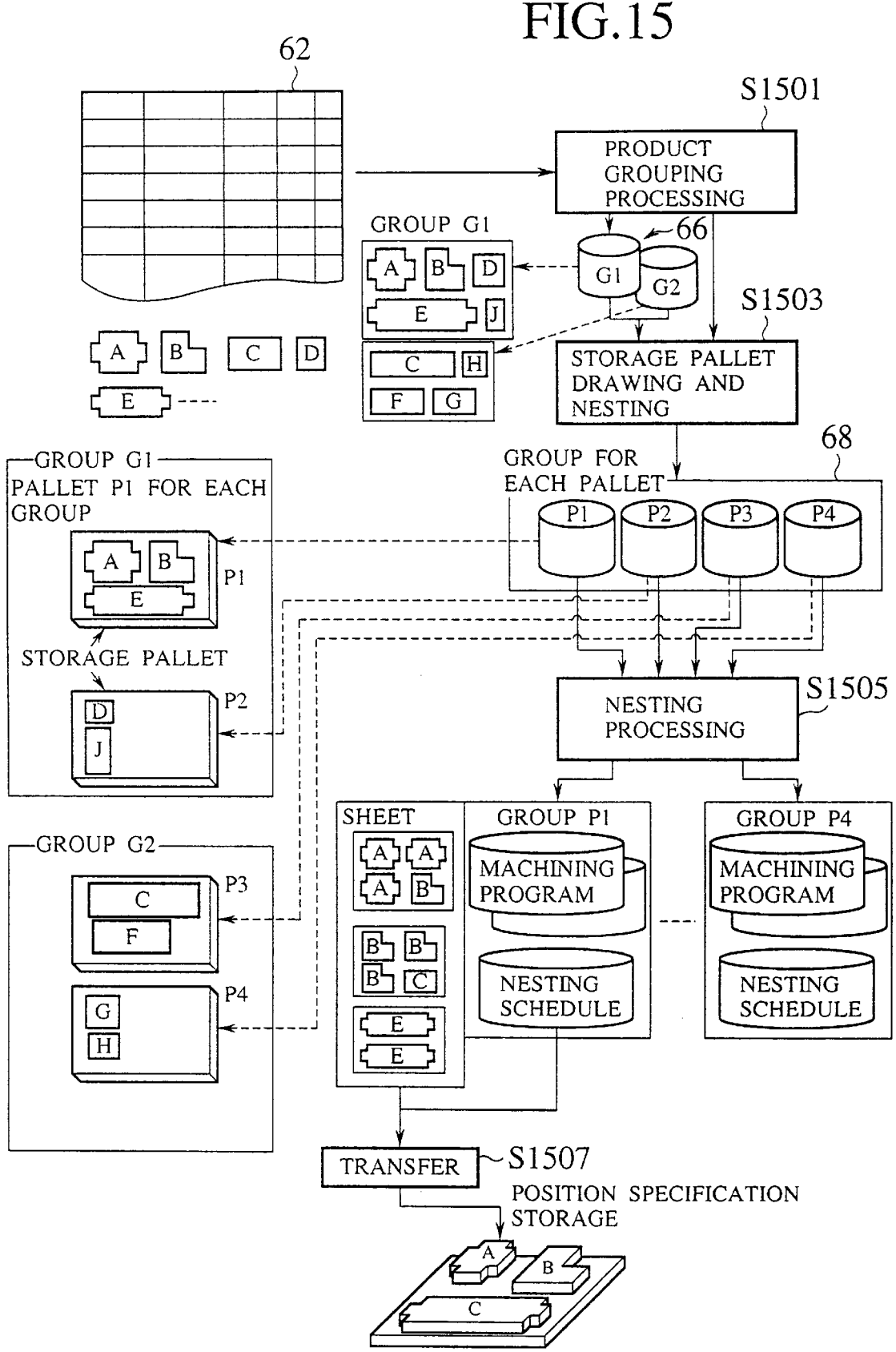
FIG. 15 is a flow chart for explaining the operation of the third embodiment of the machine tool control system according to the present invention.

In FIG. 15, out of the products A, B, D, E and J of group GI, products A, B and E are nested on pallet P1 and the remaining products D and J are nested on pallet P2 (preferably P2<P1).

Out of the products C, F, H and G of group G2, products C and F are nested on pallet P3 and the remaining products G and H are nested on pallet P4.

In these pallet nesting information ni, group numbers Gi, product names and storage positions on respective pallets are stored in a corresponding manner.

The sheet nesting unit 74 reads a machining schedule for products on a low-numbered pallet from the file 66, nests products having an early delivery date on a sheet one after another and stores this nesting information together with a corresponding machining schedule (step S1505). The sheet nesting unit 74 transfers this machining program mi for machining, reads the storage positions of products on the sheet from the pallet nesting file 68 and transfers this information (step S1507).

Therefore, as shown in FIG. 15, only products A are stored at the position of the pallet for the product A in the automatic warehouse 131, only products B are stored at the position of the pallet for the product B and only products C are stored at the position of the pallet for the product C.

As described above, according to this embodiment, information on each pallet in the automatic warehouse is acquired in advance, products are grouped according to the delivery date and type of machining for post-processing of a machining schedule, the storage positions of the group products are nested on a pallet having a shape capable of storing the grouped products, and the blanked products are stored at the respective storage positions.

Therefore, since the storage efficiency of each pallet is high and it is configured to pile up certain products only at a specific position, it is not necessary to move a pallet frequently. Since a machine tool for post-processing can thereby take out a desired material quickly, there is obtained such an effect that the machining time is fast.

Fourth Embodiment

According to a fourth embodiment, there is provided a machine tool control system which improves machining efficiency and reduces preparation work by carrying out punching in a shorter period of time than the machining or processing time required by the subsequent step.

Figure 17:
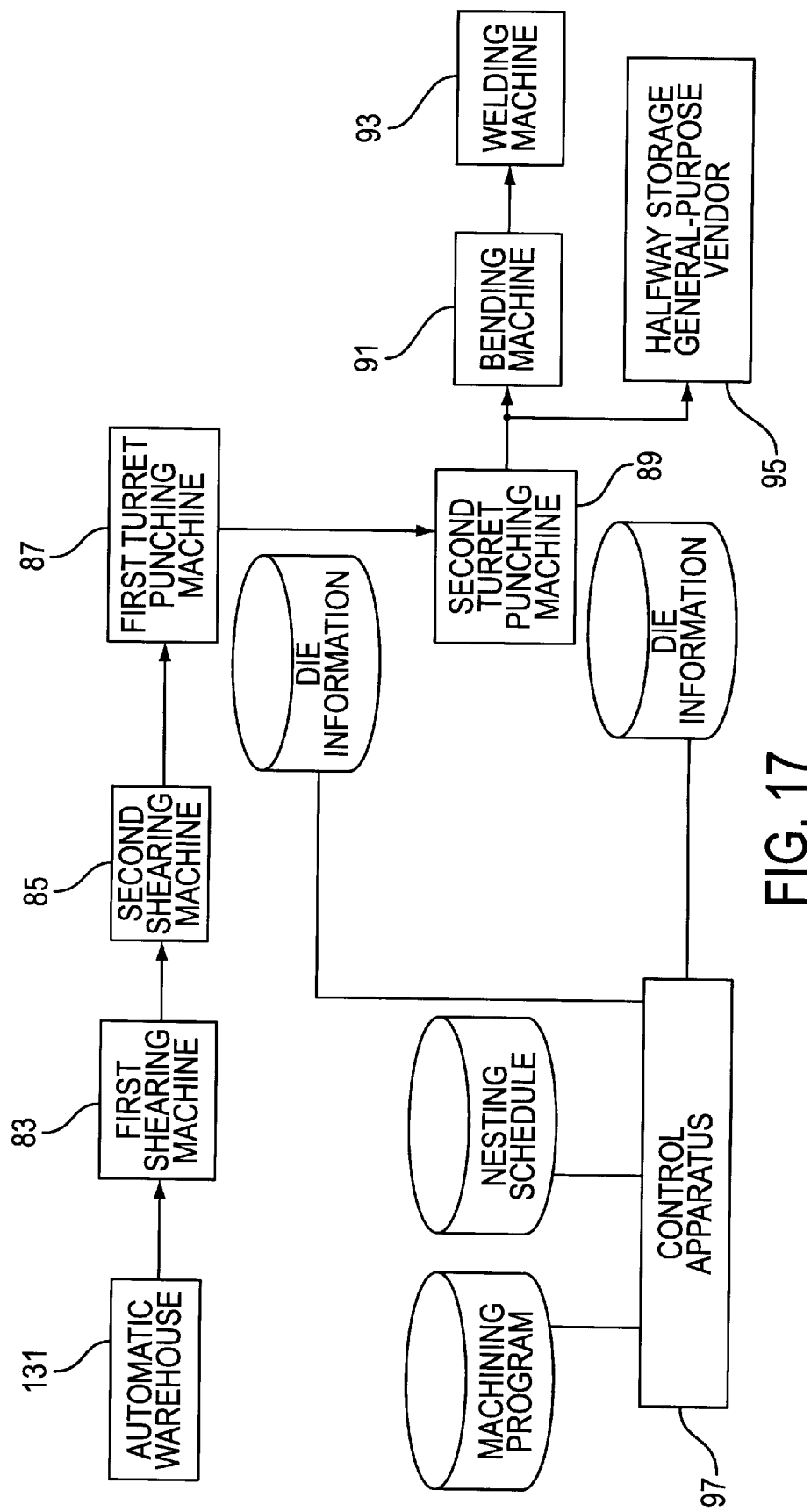
FIG. 17 is a flow chart explaining the operation of a fourth embodiment of the machine tool control system according to the present invention.

FIG. 17 is a schematic structural diagram of the fourth embodiment of the machine tool control system according to the present invention. FIG. 17 is a diagram which places emphasis on the automatic warehouse 131 and the machine tool. In the figure, the controller, the tool center, the CNC device, etc. are collectively referred simply to as "control apparatus".

In FIG. 17, a workpiece to be machine is stored on a shelf in the automatic warehouse 131. A first shearing machine 83 for shearing the workpiece along its shorter side is disposed beside the automatic warehouse 131 and a second shearing machine 85 for shearing the workpiece along its longer side is disposed beside the first shearing machine 83.

Beside the second shearing machine 85, a first turret punching machine 87 and a second turret punching machine 89 as punching machines for carrying out different types of punching on the workpiece are arranged in parallel to each other. A bending machine 91 and a welding machine 93 are arranged beside the second turret punching machine 89 and the bending machine 91, respectively. A halfway storage general-purpose vendor 95 is arranged between the second turret punching machine 89 and the bending machine 91, branching from the second turret punching machine 89. Further, a control apparatus 97 for controlling the above machine tools is provided.

Figure 18A:
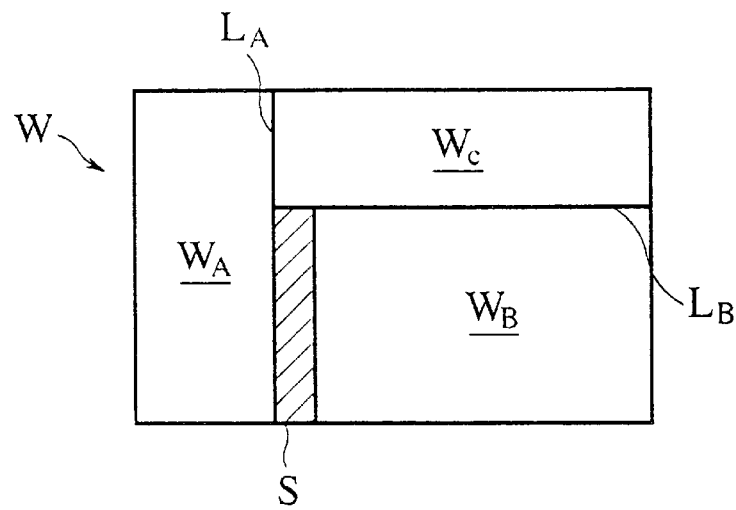
FIGS. 18A, 18B and 18C are diagrams for explaining the fourth embodiment.

The control apparatus 97, as shown in FIG. 18A, judges through comparison whether there is an odd material S in blank materials $W_A$, $W_B$ and $W_C$ after the first and second shearing machines 83 and 85 shear the blank materials $W_A$, $W_B$ and $W_C$ from a sheet material W.

Figure 18B:
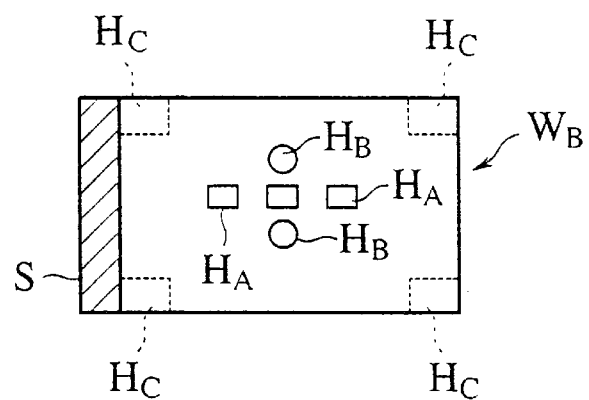

Further, the control apparatus 97, as shown in FIG. 18B, allocates the punching shapes of rectangular holes $H_A$, round holes $H_B$ and portions $H_C$ to be punched out from four corners to the sheared blank material $W_B$. The plurality of punching shapes are divided into several groups and stored. Further, the machining time of a portion to which each divided and stored punching shape is allocated and the machining time of the bending machine, for example, in the subsequent step are compared and judged.

Further, the control apparatus 97 judges through comparison whether molds mounted on the turrets of the first and second turret punching machines 87 and 89 are stored.

Moreover, NC data for machining each allocated portion is created and the blank materials $W_A$, $W_B$ and $W_C$ are punched by the first and second turret punching machines 87 and 89.

Figure 19:
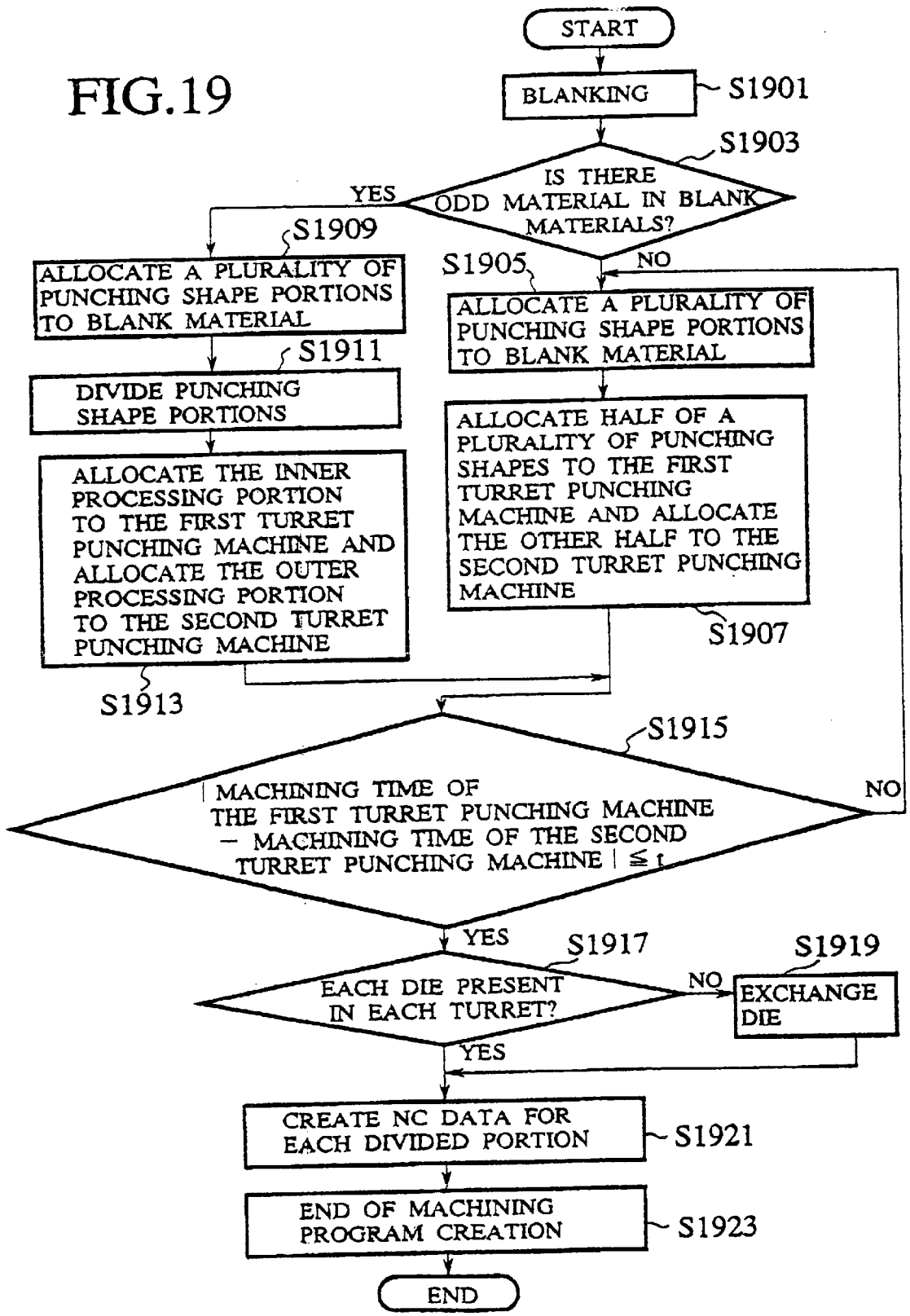
FIG. 19 is a flow chart for explaining the operation of the fourth embodiment of the machine tool control system according to the present invention.

Operation up to the creation of an NC machining program for carrying out punching by the first and second turret punching machines 87 and 89 according to the above constitution is described with reference to a flow chart shown in FIG. 19.

The blank materials $W_A$, $W_B$ and $W_C$ to be sheared from the sheet W by the first and second shearing machines 83 and 85 are first blanked (steps S1901). Thereafter, it is judged whether there is an odd material S in the blank materials $W_A$, $W_B$ and $W_C$ (steps S1903). When there is no odd material S or when there is at least one odd material S, a plurality of punching shapes (for example, rectangular holes $H_A$ round holes $H_B$ and portions $H_C$ to be punched out as shown in FIG. 18B) are allocated to the blank materials $W_A$, $W_B$ and $W_C$ (step S1905, step S1909). When there is no odd material S, after step S1905, half of the plurality of punching shapes are allocated to the first turret punching machine 87 and the other half of the plurality of punching shapes are allocated to the second turret punching machine 89 (step S1907). On the other hand, when there is at least one odd material S, after step S1909, the blank material is divided into, for example, an inner processing portion having the rectangular holes $H_A$ and the round holes $H_B$ and an outer processing portion having portions $H_C$ to be punched out (step S1911). Then the inner processing portion is allocated to the first turret punching machine 87 and the outer processing portion is allocated to the second turret punching machine 89 (step S1913).

At step S1915, it is judged whether the difference between the machining time of the first turret punching machine and the machining time of the second turret punching machine is equal to or less than a predetermined tolerance t. When the difference is more than the predetermined tolerance t, the processing returns to step S1905 to re-allocate the punching shape portions. When re-allocating the portions, the required machining time of the first and second turret punching machines may be considered. If the machining time of the second turret punching machine is longer than that of the first machine, for example, a hole to be machined by the second turret punching machine which has the same shape as a hole to be machined by the first turret punching machine and a machining type for which the die lies at the first turret punching machine are re-allocated. Similarly, when the machining time of the first turret punching machine is longer, re-allocation of the portions to be machined may be performed. It should be noted that nibbling and pattern machining are excluded from re-allocation, since accuracy may be deteriorated if those are discontinued halfway. If the machining time does not become equal to or less than the predetermined tolerance even after re-allocation and division are performed, the case where the machining time is determined to be a minimum may be adopted.

When the difference is equal to or less than the predetermined tolerance t, it is judged through comparison whether dies used for each allocated portion are memorized (step S1917). Step S1917 may be performed by the control apparatus 97 by accessing and reviewing stored die information for the first turret punching machine 87 and the second turret punching machine 89 (see FIG. 17). When there are no dies to be used in step S1911 or when the required dies are not present or set in each turret, dies are exchanged (step S1919) and the NC data for each allocated portion is created (S1921). On the other hand, when there are dies to be used, the processing proceeds to step S1921 directly. The creation of a machining program is completed due to the above processing and stored (step S1923).

The thus stored machining program is executed to allocate the plurality of punching shapes to the first and second turret punching machines 87 and 89.

Therefore, when the stored machining program is executed, such a single sheet material W as shown in FIG. 18A is carried to the first shearing machine 83 by a carrying machine (not shown) from among sheet materials stored on the shelves of the automatic warehouse 131. Then a shorter side $L_A$ of the sheet material W is sheared by the first shearing machine 83 and a longer side line $L_B$ of the sheet material W is sheared by the second shearing machine 85 to divide the sheet material W into three blank materials $W_A$, $W_B$ and $W_C$. An odd material S is present in the left portion (shown by oblique lines) of the blank material $W_B$ out of these.

This blank material $W_B$ is carried to the first turret punching machine 87 and punches and dies for three rectangular holes $H_A$ and two round holes $H_B$ which are allocated to the inner portion of the blank material $W_B$ are located at respective machining positions to machine these holes. Thereafter, this blank material $W_B$ is carried to the second turret punching machine 89 and its odd material S is nibbled and cut off with a punch and die. Thereafter, as shown in FIG. 18C, the four corners $H_C$ of the blank material $W_B$ are cut off with another set of punch and die.

Figure 18C:
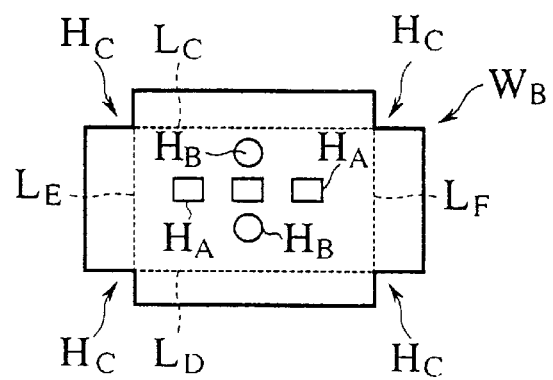

Subsequently, the blank material $W_B$ shown in FIG. 18C is folded inward along bending lines $L_C$, $L_D$, $L_E$ and $L_F$ by a press brake, for example, as the bending machine 91. This folded blank material $W_B$ is carried to the welding machine 93 and rising portions in the folded four corners are welded so that a rectangular product is produced by a series of machining steps. When this machining time is much shorter than the machining time of the bending machine 91, the workpiece $W_B$ machined by the second turret punching machine 89 may be stored on the way to the bending machine 91; that is, it may be carried and stored by the general-purpose vendor 95 and then folded.

When the first and second turret punching machines 87 and 89 are arranged to divide punching operation in this way, machining can be carried out in a shorter period of time, with greater efficiency and reduced preparation work than the prior art.

This fourth embodiment can be carried out in another form by suitably making modifications without being limited to the above example of the embodiment. Although the first and second turret punching machines 87 and 89 are arranged in parallel to each other in this embodiment, they may be arranged in series, or three or more turret punching machines may be arranged. Although a turret punching machine is used as the punching machine, another type of punching machine may be used.

More generally, it should be understood that many modifications and adaptations of the invention will become apparent to those skilled in the art and it is intended to encompass such obvious modifications and changes in the scope of the claims appended hereto.

What is claimed is:

1. A nesting method for a machine tool control system in which a controller for transferring information for managing and controlling machine tools, an automatic warehouse and a CNC device nests the blanking shapes of products on a prestored material on a pallet of the automatic warehouse based on a machining schedule from a tool center and transfers a machining program for the nested products to the machine tool warehouse, said method comprising:
   reading material information on prestored material provided on the pallet of the automatic warehouse before transferring the machining program for nesting;
   judging whether the material information matches a planned material of the machining program;
   nesting products of the machining schedule on the prestored material provided on the pallet when the material information and the planned material do not match; and
   transferring the machining program for the products that have been nested.

2. A nesting method for a machine tool control system according to claim 1, wherein, when the products of the machining schedule are newly nested on the prestored material of the material information and all the products of the machining schedule cannot be nested on the prestored material, another material in the automatic warehouse is drawn and remaining products are newly nested on the drawn material.

3. The method of claim 1, wherein the nesting further comprises allocating parts to material so that the percentage of the material effectively used is large.

4. A nesting method for a machine tool control system in which a controller for transferring information for managing and controlling machine tools, an automatic warehouse and a CNC device nests the blanking shapes of products on a prestored material on a pallet of the automatic warehouse based on a machining schedule from a tool center and transfers a machining program for the nested products to the machine tool side through the CNC device to blank the material on the pallet of the automatic warehouse, said method comprising:
   accessing information on an odd material to retrieve an odd material from which products to be interrupt nested, based on input from a terminal, can be blanked from the odd material information; and
   nesting the products to be interrupt nested on the retrieved odd material.

5. The method of claim 4, wherein the nesting further comprises allocating parts to material so that the percentage of the material effectively used is large.

6. A nesting method for a machine tool control system in which a controller for transferring information for managing and controlling machine tools, an automatic warehouse and a CNC device nests the blanking shapes of products on a prestored material on a pallet of the automatic warehouse based on a machining schedule from a tool center and transfers a machining program for the nested products to the machine tool side through the CNC device to blank the material on the pallet of the automatic warehouse, said method comprising:
   accessing information on each pallet of the automatic warehouse to group products according to a delivery date and type of machining for post-processing of the machining schedule;
   retrieving a pallet having a shape capable of storing the grouped products from the pallet information;
   nesting storage positions of the grouped products on the retrieved pallet based on the grouping information; and
   transferring, based on said nesting, the storage positions of the grouped products to the automatic warehouse together with the machining program.

7. The method of claim 6, wherein the nesting further comprises allocating parts to material so that the percentage of the material effectively used is large.

8. A punching method for a machine tool control system having a plurality of punching machines for punching a sheared material based on a transmitted machining program and causing the plurality of punching machines to punch the material in accordance with nesting information for the material, said method comprising:
   dividing the nesting information for punching by each of the plurality of punching machines and creating a plurality of machining programs for the respective divided nesting information; and transferring the plurality of machining programs to the respective punching machines simultaneously when different types of punching are made on the material.

9. The method of claim 8, wherein the nesting further comprises allocating parts to material so that the percentage of the material effectively used is large.

10. A machine tool control system for use in a machining warehouse, said machine tool control system comprising:
   a tool center that stores a machining schedule for products to be machined; and
   a controller that transfers information for managing and controlling machine tools of the machining warehouse based on the machining schedule of said tool center, said controller comprising:
      a machining schedule file that stores the machining schedule of said tool center;
      a inventory master information file that stores inventory information, said inventory information including material information on prestored material provided on a pallet of the machining warehouse;
      a dynamic nesting schedule creation unit that nests the blanking shapes of products on the prestored material based on the machining schedule of said tool center and the material information in said inventory master information file; and
      a transfer unit that transfers a machining program for the nested products to a machine tool side of the machining warehouse to blank the material on the pallet of the warehouse,
   wherein, before the machining program for the nested products is transferred by said transfer unit, said dynamic nesting schedule creation unit reads the material information on the prestored material and determines whether the material information matches a planned material of the machining program and, when the material information and the planned material are determined not to match, said dynamic nesting schedule creation unit nests products of the machining schedule on the prestored material provided on the pallet.

11. A machine tool control system according to claim 10, wherein, when products of the machining schedule cannot all be nested on the prestored material of the pallet, said dynamic nesting schedule creation unit newly nests the remaining products on another drawn material provided on the pallet of the machining warehouse based on the material information of the inventory master information file.

12. A machine tool control system according to claim 10, wherein said controller further comprises an odd material information file that stores information on one or more odd materials which are left for machining and an odd material retrieving unit that retrieves odd material information from said odd material information file and informs said dynamic nesting schedule creation unit of said odd material information, said dynamic nesting schedule creation unit activating said odd material retrieving unit to retrieve the odd material information when a nesting interrupt instruction is entered by an operator at a terminal of the machining warehouse, and nesting the products to be interrupt nested on the retrieved odd material.

13. The system of claim 10, wherein the nesting further comprises allocating parts to material so that the percentage of the material effectively used is large.

14. A machine tool control system for use in a machining warehouse, said machine tool control system comprising:
   a controller that transfers information for managing and controlling machine tools of the machining warehouse based on a machining schedule for products to be machined, said controller comprising:
      a machining schedule file that stores the machining schedule which includes the delivery date and type of machining required for each product;
      a pallet information file that stores pallet information, said pallet information including information on the shape of each pallet provided in the machining warehouse;
      a grouping unit that groups products based on the machining schedule of the machining schedule file, said products being grouped according to the delivery date and type of machining that is required for each product; and
      a pallet drawing and nesting unit that retrieves the pallet information from said pallet information file and determines a pallet having a shape that is capable of storing the grouped products, said pallet drawing and nesting unit nesting storage positions of the products on each retrieved pallet,
   wherein said controller transfers the storage positions of the nested products to the machining warehouse together with a machining program for machining the products.

15. The system of claim 14, wherein the nesting further comprises allocating parts to material so that the percentage of the material effectively used is large.

16. A machine tool control system for use in an automatic warehouse comprising plurality of punching machines for punching material based on a machining program and causing the plurality of punching machines to punch the material in accordance with nesting information, said machine tool control system comprising:
   means for dividing the nesting information for punching by each of the plurality of punching machines and creating a plurality of machining programs for the respective divided nesting information; and
   means for transferring the plurality of machining programs to the respective punching machines when different types of punching are made on the material.

17. A machine tool control system according to claim 16, wherein the plurality of machining programs are simultaneously transferred by said transferring means to the respective punching machines.

18. The system of claim 16, wherein the nesting further comprises allocating parts to material so that the percentage of the material effectively used is large.

* * * * *